R. C. BLOOMFIELD.
GEAR WHEEL.
APPLICATION FILED JAN. 17, 1910.
975,743.
Patented Nov. 15, 1910.
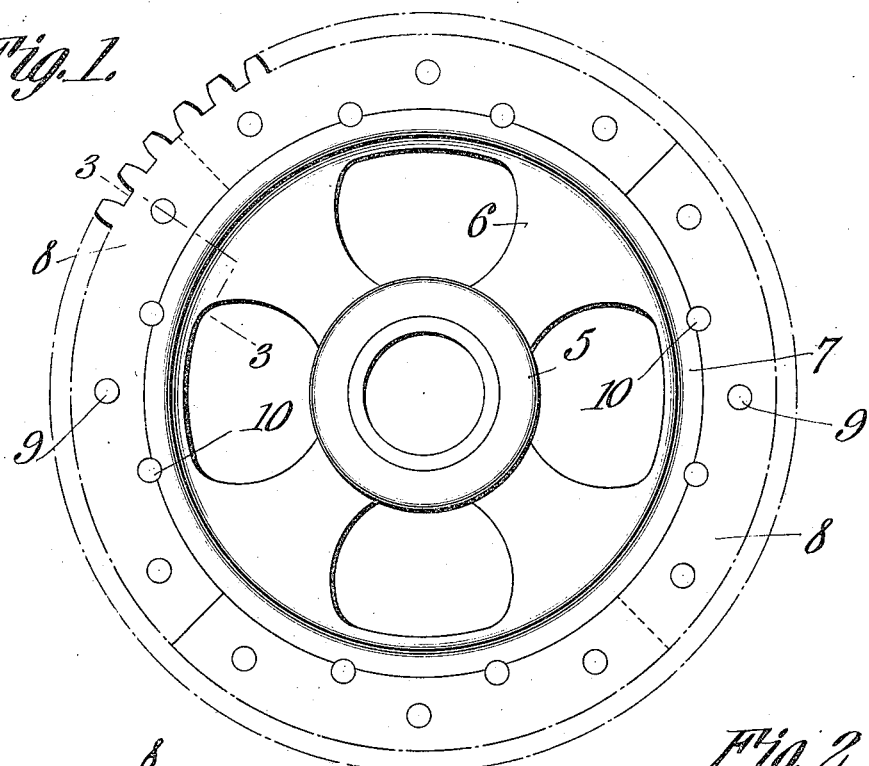
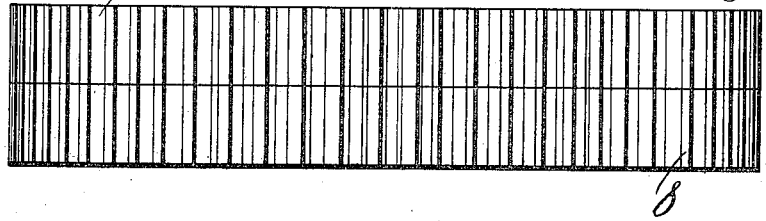
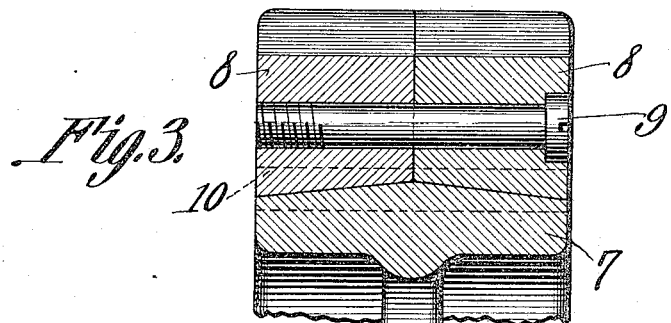
Witnesses
Inventor
Russell C. Bloomfield
By C. A. Snow & Co.
Attorneys

UNITED STATES PATENT OFFICE.

RUSSELL C. BLOOMFIELD, OF CINCINNATI, OHIO.

GEAR-WHEEL.

975,743.  Specification of Letters Patent.  Patented Nov. 15, 1910.

Application filed January 17, 1910.  Serial No. 538,520.

*To all whom it may concern:*

Be it known that I, RUSSELL C. BLOOMFIELD, a citizen of the United States, residing at Cincinnati, in the county of Hamilton and State of Ohio, have invented a new and useful Gear-Wheel, of which the following is a specification.

This invention relates to gear wheels which are provided with a rim consisting of removable sections, and it has for its object to provide in a wheel of this kind novel and improved means for securing the rim sections, so that they can be readily removed without removing the main body of the wheel from the axle or shaft.

Another object of the invention is to provide a gear wheel of the kind stated which is provided with two series of removable sections arranged side by side on the main body of the wheel, so that in case the teeth of any one of the sections become badly worn on one side, such sections may be reversed to obtain additional wear from the other side of the teeth.

With the herein stated objects in view, the invention consists in a novel construction and arrangement of parts to be hereinafter described and claimed, and in order that the same may be better understood, reference is had to the accompanying drawing, in which—

Figure 1 is a face view of a gear wheel constructed in accordance with the present invention. Fig. 2 is an edge view. Fig. 3 is a cross section on the line 3—3 of Fig. 1.

Referring more particularly to the drawing, the main body of the wheel comprises a hub 5, and a web 6 formed with an enlarged rim 7. This wheel body is designed, preferably, to be forced on the shaft or axle by hydraulic pressure, the wheel being intended more especially for heavy electric service, although not limited to such use.

The rim 7 is of a width sufficient to support the toothed segments 8 which form the detachable rim section. Two series of segments are provided, they being arranged side by side on the rim 7, with the teeth of the respective series in proper alinement. Each series is composed of two or more segments, according to the size of the wheel. The joints between the segments are broken, so that the joints between the segments of one series come midway between the joints of the segments of the other series.

The segments of one series are secured to the segments of the other series by bolts 9 passing transversely theretnrough, and to prevent the segments from slipping around on the rim 7, bolts or pins 10 are employed, said bolts or pins passing through transverse bolt holes made partly in the periphery of the rim 7, and partly in the contiguous surface of the segments.

The periphery of the rim 7 is made slightly higher at the center than at the edges, and the under surface of the segments 8 is beveled toward the center to fit the rim. With this construction it will be impossible for the segments to slip off the rim sidewise after the bolts 9 are in place, and also, when the bolts are drawn tight, they force the segments against the beveled surfaces of the rim 7, the friction between the parts preventing slipping when power is applied.

The advantages of the herein described structure are that the wheel can be cheaply manufactured, and after it has been pressed on the axle or shaft it need never be removed, the segments 8 being readily removable from the main body of the wheel, without disturbing the latter on the shaft or axle.

A worn out segment can be readily removed, and replaced by a new one, and in case of a broken tooth in a segment, such segment can be replaced without interfering with the remainder of the segments. The advantage of providing two series of segments arranged side by side on the rim 7 is that in case the teeth of any of the segments become badly worn on one side, said segments can be reversed, or placed on the other side of the wheel, thus obtaining additional wear from the other sides of the teeth.

What is claimed is:

1. A gear wheel comprising a main body, and a rim consisting of a series of removable sections mounted on the periphery of the main body, said periphery being beveled in opposite directions from the center, and the contiguous surface of the rim being shaped to fit said beveled surfaces, and means for locking the rim against turning on the main body.

2. A gear wheel comprising a main body, and a rim consisting of a series of sections arranged side by side on the periphery of the main body, said periphery being beveled from its center, and the contiguous surfaces of the rim sections being shaped to fit the beveled surface of the periphery, means for clamping the rim sections to said beveled surface, and means for locking the rim against turning on the main body.

In testimony that I claim the foregoing as my own, I have hereto affixed my signature in the presence of two witnesses.

RUSSELL C. BLOOMFIELD.

Witnesses:
    LEROY BROOKS, Jr.,
    E. S. SAWTELLE.